(12) United States Patent
Yamada et al.

(10) Patent No.: US 8,984,517 B2
(45) Date of Patent: Mar. 17, 2015

(54) SHARING IDLED PROCESSOR EXECUTION RESOURCES

(75) Inventors: Koichi Yamada, Los Gatos, CA (US); Allen M Kay, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 622 days.

(21) Appl. No.: 10/772,750

(22) Filed: Feb. 4, 2004

(65) Prior Publication Data

US 2005/0172292 A1 Aug. 4, 2005

(51) Int. Cl.
| | |
|---|---|
| G06F 9/30 | (2006.01) |
| G06F 9/48 | (2006.01) |
| G06F 9/50 | (2006.01) |
| G06F 9/38 | (2006.01) |

(52) U.S. Cl.
CPC ............ *G06F 9/3009* (2013.01); *G06F 9/4843* (2013.01); *G06F 9/5077* (2013.01); *G06F 9/3851* (2013.01); *G06F 9/5011* (2013.01)
USPC ........................................................ 718/102

(58) Field of Classification Search
CPC .............................. G06F 9/4843; G06F 9/5077
USPC ............................ 712/200, 225, 219; 718/102
See application file for complete search history.

(56) References Cited

U.S. PATENT DOCUMENTS

| | | | | |
|---|---|---|---|---|
| 4,374,409 A | * | 2/1983 | Bienvenu et al. | ............. 718/106 |
| 6,260,068 B1 | * | 7/2001 | Zalewski et al. | ............. 709/226 |
| 6,389,449 B1 | * | 5/2002 | Nemirovsky et al. | ......... 718/108 |
| 6,430,593 B1 | * | 8/2002 | Lindsley | ........................ 718/103 |
| 7,428,732 B2 | * | 9/2008 | Sandri et al. | ................... 718/104 |
| 2002/0144081 A1 | | 10/2002 | Willis et al. | |
| 2002/0184290 A1 | | 12/2002 | Olszewski et al. | |
| 2003/0105796 A1 | | 6/2003 | Sandri et al. | |

FOREIGN PATENT DOCUMENTS

| | | |
|---|---|---|
| CN | 1914593 | 2/2007 |
| JP | 03-048938 A | 3/1991 |
| JP | 06-103092 A | 4/1994 |
| WO | 00/58434 A1 | 10/2000 |
| WO | WO 2005/078575 A2 | 8/2005 |
| WO | 2005/078575 A3 | 6/2006 |

OTHER PUBLICATIONS

Nakajima et al.; "Enhancements for Hyper-Threading Technology in the Operating System—Seeking the Optimal Scheduling"; Dec. 2002; Proceedings of the $2^{nd}$ Workshop on Industrial Experiences with System Software.*

Marr et al.; "Hyper-Threading Technology Architecture and Microarchitecture"; 2002; Intel Technology Journal Q1.*

(Continued)

*Primary Examiner* — Andrew Caldwell
*Assistant Examiner* — Benjamin Geib
(74) *Attorney, Agent, or Firm* — Trop, Pruner & Hu, P.C.

(57) ABSTRACT

A processor including a plurality of logical processors, and an instruction set, the instruction set including one or more instructions which when executed by a first logical processor, causes the first logical processor to make a processor execution resource previously reserved for the first processor available to a second processor in the plurality of processors in response to the first logical processor being scheduled to enter an idle state.

20 Claims, 3 Drawing Sheets

(56) References Cited

OTHER PUBLICATIONS

Marr et al., "Hyper-Threading Technology Architecture and Microarchitecture", Intel Technology Journal, 2002.*
IBM, "Dynamic Logical Partitioning in IBM eserver pSeries", Oct. 8, 2002, pp. 1-9, XP002288348.
PCT, International Preliminary Report on Patentability (Chapter I of the Patent Cooperation Treaty), Application No. PCT/US2005/001281, dated Aug. 7, 2006.
International Search Report for PCT Patent Application PCT/US2005/001281, mailed on Mar. 27, 2006, 10 pages.
Chinese Office Action received for Chinese Patent Application No. 200580003909.1 mailed on Apr. 24, 2009, 5 pages of Office Action and 6 pages of English Translation.
Office Action received for Japanese Patent Application No. 2006-552130, mailed on Nov. 24, 2010, 2 pages of English Translation and 1 page of Office Action.
"HyperThreading Support in VMware ESX Server 2", VMware White Paper, publication on Apr. 13, 2004, pp. 1-6.

* cited by examiner

SHARING IDLED PROCESSOR EXECUTION RESOURCES

BACKGROUND

In the high level view of a processor depicted in FIG. 1a, a processor may be conceptualized as being comprised of two components, the first implementing the architectural state of the processor, such as for example its registers and program counter, and the second composed of processor execution resources, such as, for example, a translation lookaside buffer (TLB).

In one type of multiprocessing processor based system, as depicted in FIG. 1b, multiple physical processors are interconnected by a bus system, and each physical processor maintains a separate architectural state in hardware as well as a separate set of processor execution resources in hardware. In a thread scheduling scenario where each processor of such a system is scheduled to execute a different thread, an instance may arise when one of the processors in the system is idled because it is waiting on a slower device in the system, such as a disk drive, or because it is currently not scheduled to execute a thread. In this instance, the processor and all of its execution resources are also idled and unavailable to other processors of the system.

In another type of processor based system such as that depicted in FIG. 1c, a hardware processor that maintains separate architectural states in the processor's hardware for a plurality of logical processors may, however, have a single processor core pipeline that is shared by the logical processors and a single set of processor execution resources, including the TLB, that is shared by the logical processors. Such a processor architecture is exemplified by the Intel® Xeon™ processor with Hyper Threading Technology, among others, and is well known in the art.

In such a logical multiprocessing system, a thread scheduler may schedule a different thread to execute on each of the logical processors because each logical processor maintains its architectural state separately from all other logical processors. When a logical processor is idled by an operating system thread scheduler or is waiting for data from a slow storage device, it may either execute an idle task, typically a tight loop, and periodically check for an interrupt; or it may suspend its activity and wait for a wake up signal of some type to resume execution of a thread.

In contrast to a multiprocessing system where processor execution resources are physically separated, in this type of logical multiprocessing system, when one of the multiple logical processors in such a system is idled, dynamically allocated processor execution resources that are not being used by the idled logical processor may be available to other logical processors that are currently executing threads for the user or the system.

Processor execution resources in a logical multiprocessing system may, however, be reserved for a logical processor. This may occur in different ways. For one example, a logical processor may lock a dynamically allocated processor execution resource such as a translation register (TR) from the TLB thus making it unavailable to other logical processors. In another instance, the logical processor may be statically allocated processor execution resources such as TCs and thus these statically allocated resources may be unavailable to other logical processors. These reserved resources typically continue to be unavailable to other logical processors even after the logical processor for which they are reserved is idled. Thus, TRs that are locked by a logical processor generally continue to be locked by the logical processor while it is idling; and statically allocated TCs allocated to the logical processor continue to be statically allocated to the logical processor while it is idling.

DETAILED DESCRIPTION

Figure 1C:
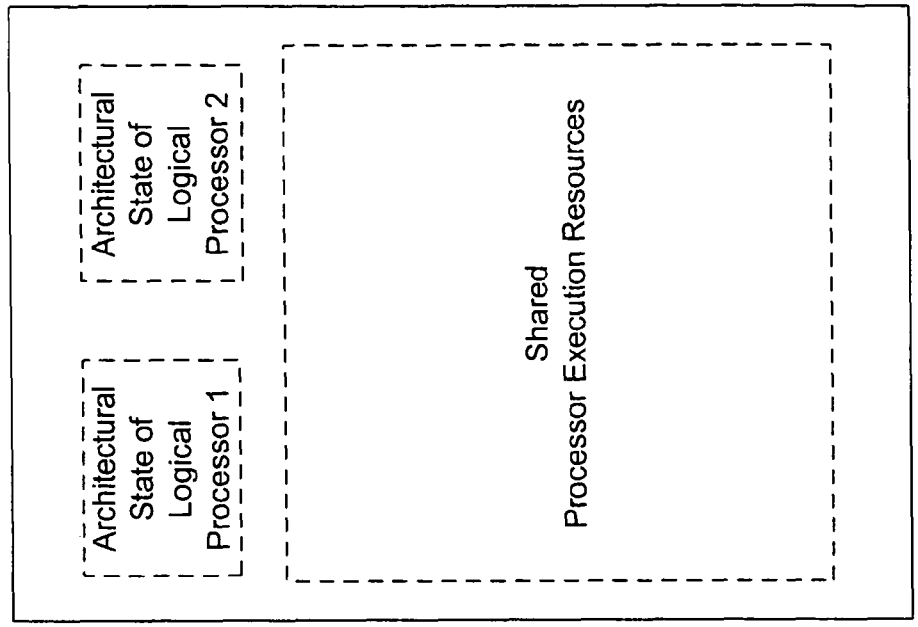
FIG. 1 Depicts high level views of different types of processor architectures.
Figure 1B:
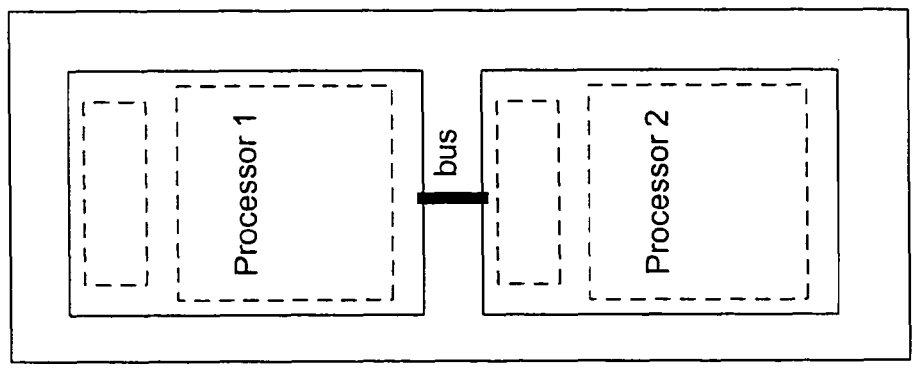
Figure 1A:
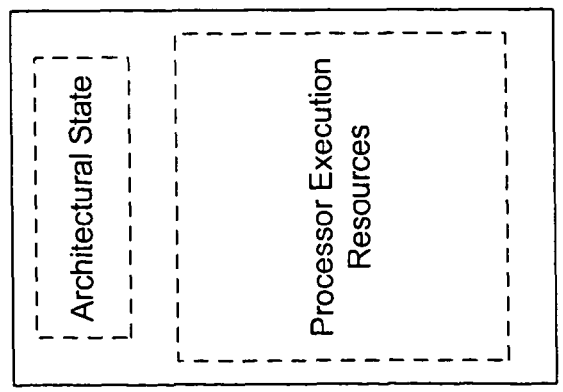
Figure 2:
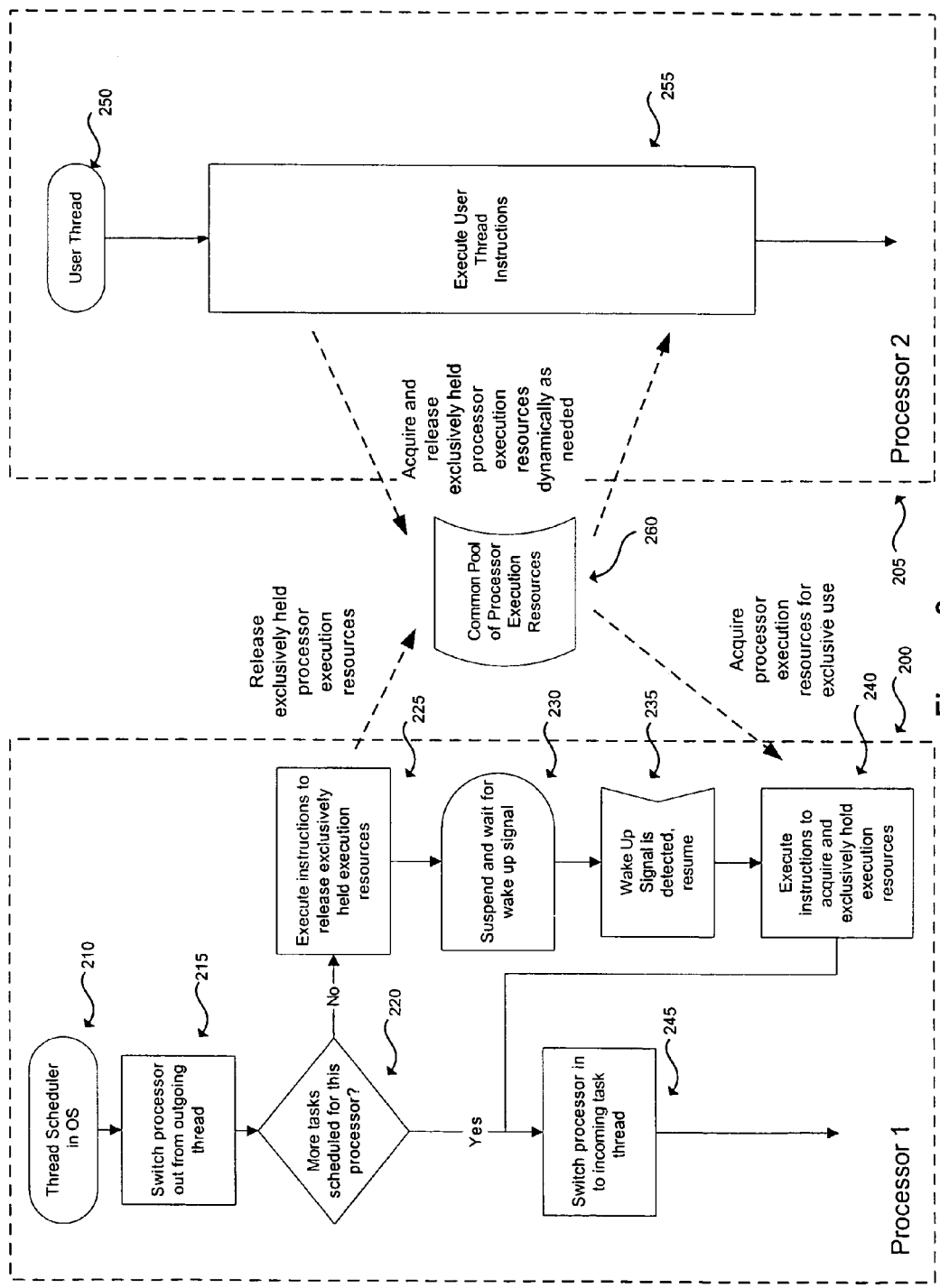
FIG. 2 is a flowchart of processing in one embodiment.

In one embodiment processing occurs as depicted in the high level flowchart in FIG. 2. In the figure, two logical processors, Processor 1, 200, and Processor 2, 205, are executing threads scheduled by an operating system that includes a thread scheduler 210. At 215, Processor 1 is switched out from an executing thread due to, for instance, termination of the thread or a page fault, and returns to the thread scheduler. If no more tasks are scheduled for this logical processor, 220, the processor executes an idling sequence, 225-230. First, the logical processor gives up any reserved processor execution resources held by the logical processor 225, releasing them to the common pool 260. Thus for example, Processor 1 may return a Translation Cache entry or Translation Cache Register to the general pool of registers in the Translation Lookaside Buffer.

In different embodiments, the processing in step 225 may differ. In some embodiments, the exclusively held resource released may be a dynamically allocated resource and have previously been locked by Processor 1. In such an embodiment, in step 225, the logical processor unlocks the resource and thereby makes it available to other logical processors. In another embodiment, the exclusively held resource may have been previously statically allocated to Processor 1. In such embodiments, in step 225, the statically allocated resource is deallocated and is returned to the pool of dynamically allocated resources 260.

After Processor 1 enters an idled state, such as a state of suspension 230 in this embodiment, it may be requested for execution of a new or resumed thread by a wake up signal such as an interrupt 235. In other embodiments the processor may enter an idle task loop instead of the suspension depicted at 230 and periodically check for interrupts.

Following the wake up signal, the logical processor then re-acquires the exclusively reserved resources by either locking or statically allocating them to itself as necessary, 240. The logical processor then switches to an incoming thread and continues execution of that thread, 245.

The resources freed by Processor 1 before suspension or idling at 225 become available to another logical processor such as Processor 2, 205, executing a thread such as the depicted user thread 250. These resources may then be dynamically allocated to the logical processor as necessary from the pool of shared processor execution resources during the execution of the thread, 255.

Figure 3:
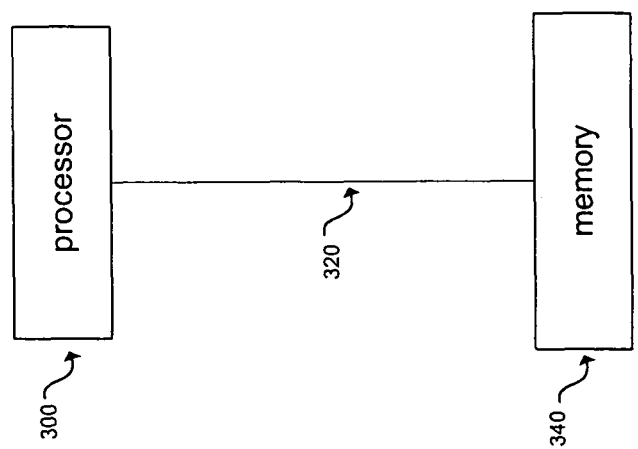
FIG. 3 depicts a processor based system in one embodiment.

FIG. 3 depicts a processor based system in one embodiment where the logical processors are implemented as part of a processor 300. Programs that execute on the logical processors are stored in memory 340 connectively coupled to the processor by bus system 320. The memory may include a non-volatile memory section storing firmware that includes a thread scheduler performing processing substantially as described above.

Many other embodiments are possible. For instance, while the above description limits itself to logical processors, similar processing is applicable to physically separate multiprocessors that share any common execution resources. In such embodiments, a hybrid version of logical and physical multiprocessing is implemented where separate architectural states and some execution resources are separated in hardware, but other execution resources are shared in hardware and may be released using processing similar to that depicted in FIG. 2. In some embodiments, the thread scheduler referenced above may form a component of firmware resident in non-volatile memory as depicted in FIG. 3, while in others it may be a portion of operating system software stored on disk media accessible to the processor. In some embodiments, the actions taken to release and reserve processor execution resources may be directly implemented in hardware and ancillary to the processor's instruction execution system, while in other embodiments they may be actions taken by the processor as part of the execution of one or more instructions of the processor's instruction set. That is, the instruction set may include one or more instructions which, when executed by a first logical processor, cause the first logical processor to make a rocessor execution resource previously reserved for the first processor available to a second processor. In some embodiments the shared execution resources may include special purpose registers unrelated to the TLB. Embodiments are not limited to two processors, three or more processors may share execution resources and perform processing analogous to the processing described above.

Embodiments in accordance with the claimed subject matter may be provided as a computer program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the invention but to illustrate it. The scope of the claimed subject matter is not to be determined by the specific examples provided above but only by the claims below.

What is claimed is:

1. A method comprising:
    in an operating system thread scheduler, detecting that a thread executed by a processor has terminated;
    switching the processor out from the ongoing thread;
    checking only once if there are other tasks scheduled for the processor; and
    if not, commanding the processor to release an execution resource held by the processor and to suspend.

2. The method of claim 1 further comprising:
    in a processor based system where a plurality of logical processors of a single physical processor share processor execution resources of the single physical processor, in response to a first logical processor in the plurality of processors being scheduled to enter an idle state due to lack of scheduling tasks, making a processor execution resource previously reserved for the first logical processor available to any of the plurality of logical processors.

3. The method of claim 2 further comprising reserving the processor execution resource for the first processor in response to the first processor being scheduled to execute a task.

4. The method of claim 3 wherein each of the plurality of processors is a logical processor of the processor based system.

5. The method of claim 4 wherein the first processor being scheduled to enter an idle state further comprises the first processor executing a processor instruction requesting the first processor to enter an idle state.

6. The method of claim 5 wherein making the processor execution resource previously reserved for the first processor available to any of the plurality of processors further comprises releasing the processor execution resource into a common pool of processor execution resources.

7. The method of claim 6 wherein the common pool of processor execution resources comprises a translation lookaside buffer and the processor execution resource is a translation cache entry from the translation lookaside buffer.

8. The method of claim 3 wherein the first processor being scheduled to execute a task further comprises the first processor receiving a wake up signal.

9. The method of claim 8 wherein the processor execution resource previously reserved for the first processor further is statically allocated to the first processor; and wherein releasing the processor execution resource into a common pool of processor execution resources further comprises de-allocating the processor execution resource from the first processor.

10. The method of claim 8 wherein the processor execution resource previously reserved for the first processor is locked by the first processor; and
    wherein releasing the processor execution resource into a common pool of processor execution resources further comprises unlocking the processor execution resource.

11. A non-transitory machine accessible medium having stored thereon data which, when accessed by a processor, causes the processor to perform a method comprising:
    in an operating system thread scheduler, detecting that a thread executed by the processor has terminated;
    switching the processor out from the ongoing thread;
    checking only once if there are other tasks scheduled for the processor; and
    if not, commanding the processor to release an execution resource held by the processor and to suspend.

12. The machine accessible medium of claim 11 further comprising:
    wherein the processor is a single physical processor in a system where a plurality of logical processors implemented in the single physical processor share processor execution resources of the physical processor, in response to a first logical processor in the plurality of logical processors being scheduled to enter an idle state due to lack of scheduled tasks, making a processor execution resource previously reserved for the first logical processor available to a second logical processor in the plurality of processors.

13. The machine accessible medium of claim 12 further comprising reserving the processor execution resource for the first processor in response to the first processor being scheduled to execute a task.

14. The machine accessible medium of claim 13 wherein each of the plurality of processors is a logical processor of the processor based system.

15. The machine accessible medium of claim 14 wherein the first processor being scheduled to enter an idle state further comprises the first processor executing a processor instruction requesting the first processor to enter an idle state.

16. The machine accessible medium of claim 15 wherein making the processor execution resource previously reserved for the first processor available to a second processor further comprises releasing the processor execution resource into a common pool of processor execution resources accessible from the second processor.

17. The machine accessible medium of claim 16 wherein the first processor being scheduled to execute a task further comprises the first processor receiving a wake up signal.

18. The machine accessible medium of claim 17 wherein the processor execution resource previously reserved for the first processor further comprises the processor execution resource previously statically allocated to the first processor; and wherein releasing the processor execution resource into a common pool of processor execution resources further comprises de-allocating the processor execution resource.

19. The machine accessible medium of claim 17 wherein the processor execution resource previously reserved for the first processor further comprises the processor execution resource previously locked by the first processor; and wherein releasing the processor execution resource into a common pool of processor execution resources further comprises the first processor unlocking the processor execution resource.

20. The machine accessible medium of claim 17 wherein the common pool of processor execution resources comprises a translation lookaside buffer and the processor execution resource is a translation cache entry from the translation lookaside buffer.

* * * * *